United States Patent [19]

Ozaki

[11] Patent Number: 4,527,671
[45] Date of Patent: Jul. 9, 1985

[54] ROTARY DIRECTION REGULATOR FOR SYNCHRONOUS ELECTRIC MOTOR

[75] Inventor: Osamu Ozaki, Nagoya, Japan

[73] Assignee: Sanyei Corporation, Japan

[21] Appl. No.: 583,883

[22] Filed: Feb. 27, 1984

[51] Int. Cl.³ .............................................. F16D 63/00
[52] U.S. Cl. ................................... 188/82.74; 310/41; 310/162
[58] Field of Search ........... 310/41, 164, 162, 40 MM, 310/163, 76, 77; 74/569; 188/82.74, 82.7, 82.77

[56] References Cited

U.S. PATENT DOCUMENTS

| | | | |
|---|---|---|---|
| 3,200,915 | 8/1965 | Lundin | 310/41 |
| 3,307,056 | 2/1967 | Wooley | 310/41 |
| 3,354,993 | 11/1967 | van der Lely | 310/41 |
| 3,448,308 | 6/1969 | Pervorse | 310/41 |
| 3,751,697 | 8/1973 | Morley | 310/41 |
| 3,860,841 | 1/1975 | Jullien-Davin | 310/41 |
| 4,061,936 | 12/1977 | Wooley | 310/41 |

FOREIGN PATENT DOCUMENTS 1538026  1/1970  Fed. Rep. of Germany ........ 310/41

Primary Examiner—R. Skudy
Attorney, Agent, or Firm—Ostrolenk, Faber, Gerb & Soffen

[57] ABSTRACT

A rotary direction regulating device for a synchronous electric motor. A plate is disposed on the rotor shaft which rotates with the rotor. A stopper is supported for axial movement in an eccentric axial hole through the plate. At opposite axial sides of the stopper, respective generally parallel, inclined cam surfaces move the stopper axially as the rotor rotates. The stopper is guided by the inclined surfaces to move axially and to permit the rotor and the regulating plate to rotate in the correct direction of rotation. One of the cam surfaces has a sharply inclined stopper wall oriented generally parallel to the axis of the rotor and the opposite cam surface shifts the stopper to abut the stopper wall upon reverse rotation of the rotor and the plate. That abutment prevents rotor reverse rotation. The stopper is supported for swinging with respect to the plate in its axial motion. The cooperating cam surfaces are opposite each other and are in cam plates disposed at opposite sides of the stopper.

17 Claims, 7 Drawing Figures

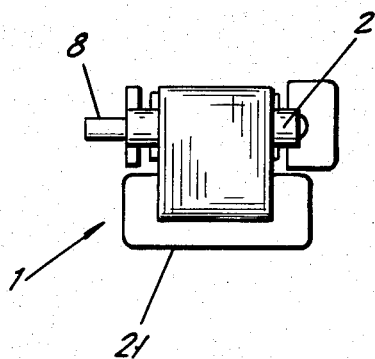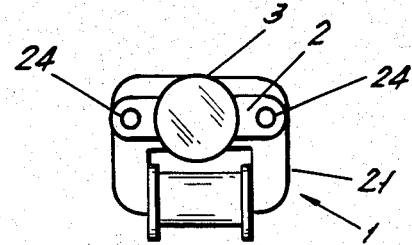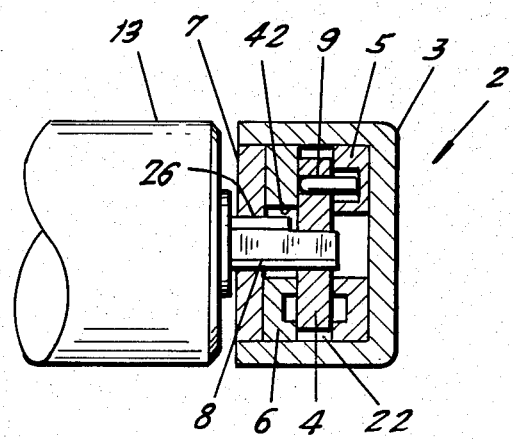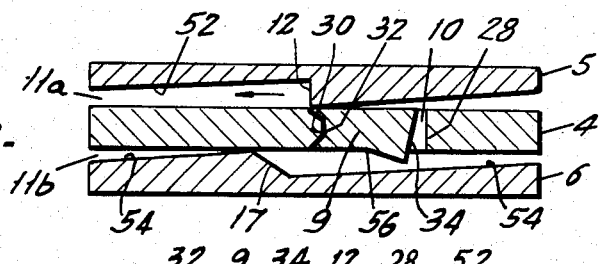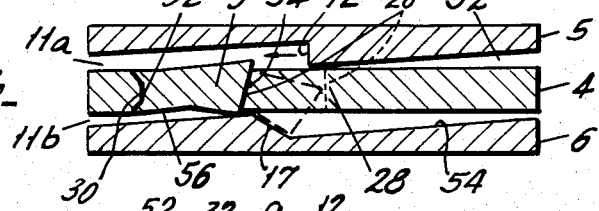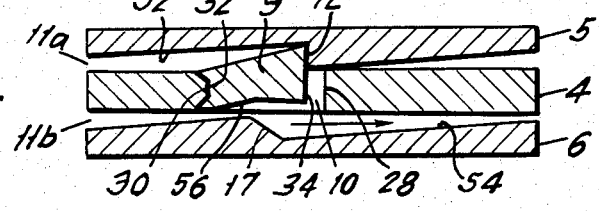

ROTARY DIRECTION REGULATOR FOR SYNCHRONOUS ELECTRIC MOTOR

BACKGROUND OF THE INVENTION

The present invention relates to a regulator for the rotation direction of the rotor of a motor, and particularly a synchronous electric motor. The regulator uses a stopper that is controlled by cam means to regulate the rotation direction of the rotor.

A synchronous electric motor using a permanent magnet as its rotor is highly efficient. It, therefore, becomes possible to reduce the overall size of the electric motor, as compared with inductive electric motors. A synchronous electric motor has the additional advantage that there is scarcely any irregularity in the rotation of its permanent magnet rotor.

In "shaded" coil inductive electric motors the rotation direction of the motor rotor is automatically regulated. In contrast, one of the shortcomings of a synchronous electric motor is that the initial rotary direction of its rotor at start-up of the motor is not always predictable. This has led to the development of many different devices for regulating the rotary direction of a conventional synchronous electric motor rotor. Conventional solutions, however, make it quite difficult to significantly reduce the size of the synchronous motors, and the conventional regulating devices and/or the motors with which they are used have had quite short durability. In some prior synchronous motor rotary direction regulating devices, when the temperature of the coil of the motor becomes high in particular, it has been difficult to achieve rotary direction regulation due to the torque deficiency of the motor.

SUMMARY OF THE INVENTION

Accordingly, it is primary object of the present invention to regulate the rotary direction, especially at start-up, of a rotor of an electric motor, and particularly of a synchronous electric motor.

It is another object of the invention to permit minimizing of the size of the electric motor.

It is a further object of the invention to provide a direction regulating device which is quite durable, making the motor have a long life.

According to the present invention, the rotor rotates with respect to stationary cam means oriented generally perpendicular to the axis of the rotor. A stopper eccentric to the rotor and rotatable therewith engages the cam means and is guided thereby to shift axially with respect to the rotor as the stopper is rotated along with the rotor. The cam means include at least one short section that is sharply inclined with respect to the remainder of the cam means, and that is more closely angled to the direction of extension of the rotor than the remainder of the cam means. This section of the cam defines a stopper wall which obstructs rotation of the rotor and the stopper past the stopper wall in one direction, while permitting the stopper and the rotor to rotate past the stopper wall in the other direction, in which the stopper does not meet a similarly sharply inclined section of the cam.

More particularly, the stopper is supported eccentrically of the rotor in a regulating plate which is attached on the rotor to rotate therewith. A hole extending axially through the rotating plate receives the stopper and permits the stopper to move axially with respect to the rotor while remaining in the hole in the regulating plate and being guided by the side walls of that hole in the regulating plate and by the cam means.

The cam means comprises at least one stationary cam plate next to the side of the regulating plate, and preferably comprises cam plates on both axial sides of the regulating plate. The cam plates include cam surfaces that are placed so that throughout the annular pathway of the stopper, the stopper axial position is guided by the cam surfaces in the two cam plates, so that the stopper shifts axially back and forth with respect to the regulating plate supporting it. Preferably, the cam surfaces in the cam plates comprise the bottom walls of respective annular grooves in the surfaces of the cam plates facing toward the regulating plate, and the axial ends of the stopper generally engage the bottom walls of the grooves in the cam plates.

The stopper wall which is abutted by the stopper is defined by a short section of the bottom wall of one of the grooves. The stopper wall is sharply inclined with respect to the remainder of the bottom wall of that groove and is inclined more to the direction parallel to the axis of the rotor. The cam surfaces in the grooves normally urge the stopper to a position such that when the rotor and the stopper are rotating in the incorrect direction, the stopper will rotate into abutment against the stopper wall and undesired rotation of the stopper in the incorrect direction will be abruptly halted. On the other hand, when the rotor and stopper are rotating in the correct direction, the cam surface bottom walls of the grooves are not shaped to present an abrupt stopper wall to the stopper and the stopper simply rotates past the stopper wall which does not impede the rotation of the rotor in the correct direction.

Other objects and features of the present invention will become apparent from the following description of a preferred embodiment of the invention, taken in conjunction with the accompanying drawings.

BRIEF DESCRIPTION OF THE DRAWINGS

FIG. 1 is a side view of a synchronous electric motor in which the invention is provided;

FIG. 2 is a front view of that motor;

FIG. 3 is an enlarged, fragmentary and cross-sectional view of the rotor rotary direction regulating device according to the invention;

FIG. 5 is a developed view of the camming arrangement for the stopper of the regulating device of the invention, wherein the rotor and the supported stopper are rotating in the correct direction;

FIG. 6 is the same type of view as FIG. 5, showing the passage of the stopper past the stopper wall while the rotor is rotating in the correct direction; and FIG. 7 shows the cooperation between the stopper and the stopper wall when the rotor and stopper are rotating in the incorrect direction, for halting incorrect direction rotation of the rotor.

DESCRIPTION OF THE PREFERRED EMBODIMENT

Figure 4:
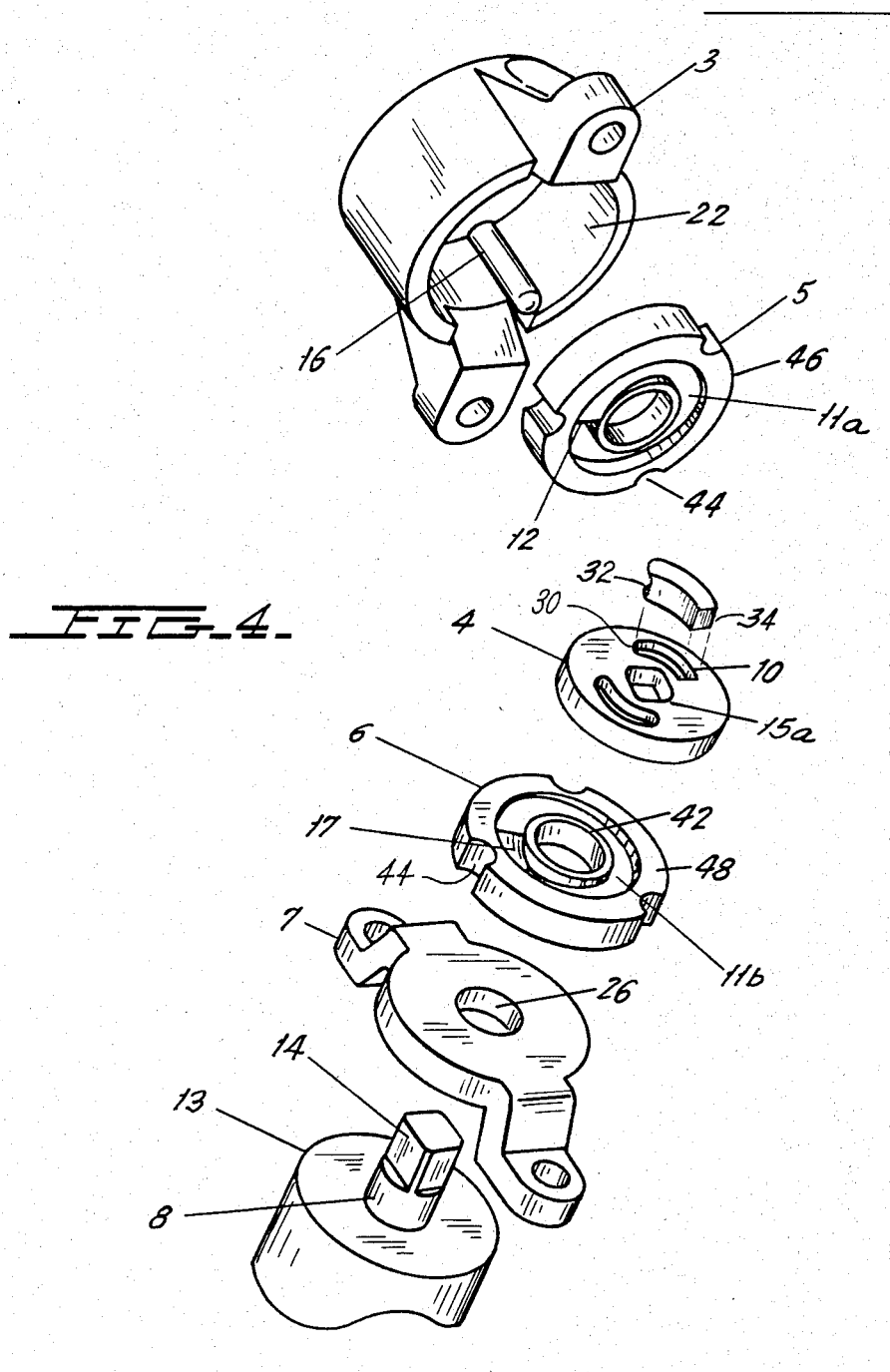
FIG. 4 is an exploded perspective view of the rotor rotary direction regulating device shown in FIG. 3.

Referring to FIGS. 1 and 2, a conventional synchronous electric motor 1 includes a permanent magnet rotor 13, hidden inside the casing 21 of the motor. The rotor includes an integral or attached rotor shaft 8 which projects from the end of the rotor and rotates with it.

At one end of the rotor the bracket assembly 2 is provided. As shown in FIG. 2, the cover 3 of the bracket assembly 2 is fixed to the casing 21 of the motor by the screws 24, whereby the cover 3 does not rotate with the rotor 13 and its shaft 8.

As can be seen in FIGS. 3 and 4, the cover 3 of the bracket assembly 2 includes a circular opening defined by the inside side wall 22 of the cover 3. The below-described cam plates 5 and 6 are sized to be supported on the inside wall 22 of the cover 3. A rib 16 is provided on the inside wall 22 for fixing the cam plates 5 and 6 against rotation, also as described below.

At the other side of the bracket assembly from cover 3 is the holding plate 7 which closes the open space inside the cover 3 and retains the below-described elements of the rotary direction regulating device inside the cover 3. The holding plate is held to the motor casing 21 like the bracket 3 by the screws 24.

The rotor shaft 8 protrudes axially from the rotor, through the hole 26 in the holding plate 7 and into the interior of the cover 3. Flats 14 are formed on the shaft 8 to enable affixation of the regulating plate 4 holding the regulating plate on the shaft 8 to rotate along with the rotor.

A stopper carrying regulating plate 4 is disposed on the rotor shaft 8 for rotating therewith. The opposite axial sides of the plate 4 are flat and parallel. The central hole 15 of the regulating plate 4 is shaped correspondingly to the profile of the shaft 8, so that when the plate 4 is positioned on the shaft 8, the regulating plate 4 will rotate with the shaft 8 and the rotor 13.

An approximately arcuately curved opening 10 is formed in the plate 4 and extends axially completely through the plate for receiving the below-described stopper 9 therein in a manner which permits the stopper 9 to project axially from the plate 4 in opposite axial directions, as guided by the below-described cams. The opening 10 is eccentric of the rotor shaft 8, whereby the opening 10 and thus the stopper 9 rotate over an annular pathway as the plate 4 and the rotor rotate. Although two openings 10 are shown in FIG. 4, only one of those openings is needed. With two openings 10, two stoppers 9 may be provided, and each would operate in the same manner.

As shown in FIGS. 5-7, that circumferential end wall 28 of the opening 10 which trails the rotary motion of the regulating plate and the rotor when they are rotating in the correct direction is flat or is otherwise shaped to permit the stopper 9 to shift axially in the opening 10 with respect to the regulating plate 4 in normal use. The opposite circumferential end wall 30 of the opening 10, which end wall 30 leads the motion of the stopper 9 when the plate 4 and rotor 8 are rotating in the correct direction, is illustrated as being convexly profiled to support the cooperating corresponding circumferential leading edge of the stopper 9. This prevents that leading edge of the stopper 9 from shifting axially along with the trailing edge of the stopper, as described below, which thereby causes the stopper to swing or pivot through its axial motion, rather than reciprocating.

The stopper 9, disposed in the opening 10, is adapted for movement axially of the direction of extension of the rotor shaft 8. Corresponding to the curved shape of the opening 10, the stopper 9 is an arcuately shaped body of approximately the arcuate length of the opening 10. But the stopper is slightly shorter than that length so that the stopper 9 can swing to move axially of the plate 4. As can be seen in FIGS. 5-7, the leading end 32 of the stopper 9 has a concave groove defined in it corresponding to the convex projecting end wall 30 defining the opening 10. The leading end 32 of the stopper rides on the leading end wall 30 of the opening 10, which prevents the leading end 32 of the stopper from shifting axially, while the trailing end portion 34 of the stopper is swung axially by the below-described cams. The trailing end 34 of the stopper is flat, or at least is shaped to cooperate with the trailing end wall 28 of the opening 10, so that the trailing end wall 28 does not interfere with the axial shifting of the trailing end 34 of the stopper 9.

In order to enable the stopper 9 to cooperate with the below-described cams, the trailing end portion 34 of the stopper is wider in the axial direction than the leading end 32 thereof, and the opposite axial sides of the stopper are profiled to gradually widen toward the end portion 34 for cooperating with the profiles of the cams.

Also disposed inside the cover 3 of the bracket assembly are a pair of cooperating cam plates, 5 at the outboard side and 6 at the inboard side. These cam plates include respective inward facing surfaces that are adjacent the respective opposite surfaces of the regulating plate 4. The cooperation between these opposed surfaces of the regulating plate and the cam plates positions these plates with respect to each other, and thereby also positions the below-described cams precisely with respect to the stopper 9. The central openings 42 in the cam plates 5 and 6 are wide enough to fit around the rotor shaft 8 without contacting it. The cam plates 5 and 6 are externally of the size and profile of the interior wall 22 of the bracket assembly cover 3. Further, the plates 5 and 6 both have notches 44 in their peripheries which are slipped over the fixing rib 16 in the side wall 22 of the bracket assembly cover 3, and this both positions the cam plates 5 and 6 and prohibits their rotation as the rotor 13, 8 and the plate 4 are rotated.

Both inwardly facing surfaces of the cam plates 5 and 6 are provided with respective camming means, now described. On the inwardly facing surface 46 of the cam plate 5 and on the inwardly facing surface 48 of the cam plate 6, respective grooves 11a and 11b are defined. These are annular grooves, which are spaced radially from the axis of the rotor the same distance as the stopper 9, so that the stopper 9 can ride through these grooves. As most clearly seen in the developed views of FIGS. 5-7, the bottom walls 52 and 54 of the grooves 11a and 11b, respectively, are not flat but are instead profiled to define cam surfaces for the stopper 9. The cam surfaces 52 and 54 are respectively so shaped that with the cam plates held at the correct orientation with respect to each other by the rib 16, the cam surfaces 52, 54 are approximately a constant distance from each other around the entire camming grooves 11a, 11b. The surfaces 52, 54 also are inclined in the axial direction, with the major arcuate part of the pathway being inclined, as shown, gradually in the direction into the cam plate 6, that is back toward the rotor 13. The cam surface pathways incline toward the cam 5 and away from the rotor 13 along the arcuately short-length, non-continuous part 17 of the surface 54. When the stopper 9 moving in the correct direction shown by the arrow in FIG. 5 contacts the non-continuous part 17 of the surface 54, especially due to the cooperating shaping of the surface 56 of the stopper 9, the stopper glides past the non-continuous part 17 of the surface 54 and then begins its gradual descent along the continuous, gradually inclined major part of the surface 54.

The cam surface 52 of the cam plate 5 also has a short circumferential length non-continuous part 12 in the circumferential vicinity of the non-continuous part 17. Unlike the non-continuous part 17 of the surface 54 of cam plate 6, the non-continuous part 12 of surface 52 is sharply turned with respect to the direction of extension of the remaining major part of the surface 52. In fact, the non-continuous part 12 of the surface 52 is oriented parallel to the direction of extension of the rotor shaft 8 and thereby defines a stopper wall which the stopper 9 cannot pass, when the stopper is moving in the incorrect direction, as shown in FIG. 7. To enable the stopper wall 12 to operate, the more gradually inclined cam surface part 17 is inclined to generally oppose the stopper wall 12. Therefore, while both groove bottom wall cam surfaces 52, 54 are inclined and generally parallel to each other for cooperatingly guiding the stopper 9, at their non-continuous parts 12 and 17, their respective inclines differ from each other for providing the desired movement to the stopper 9, which movement will be further described below.

The thickness of the regulating plate 4 and of the stopper 9 in the axial direction of the rotor and the depths of the grooves 11a and 11b are all selected so that the stopper 9 will be able to slide through the opening 10 in the regulating plate 4 without moving out of that opening and the stopper 9 will be controlled in its movement in the grooves 11a, 11b so that it can shift parallel to the direction of extension of the rotor shaft 8 and rotor 13, as the rotor rotates.

In an alternate embodiment, not shown in the drawings, a circular pin-shaped stopper is substituted for the arcuately shaped stopper 9 shown in the drawings hereof. The opening 10 in the regulating plate 4 would be correspondingly shaped for supporting and guiding the pin to shift axially with respect to the regulating plate and the cam grooves 11a, 11b. However, for best operation, it has been found that the arcuately elongate stopper 9 cooperates better with the non-continuous parts 17 and 12 of the cam surfaces than would a shorter arcuate length pin.

Operation of the rotor direction regulating device according to the invention is now described. The permanent magnet rotor 13 rotates and causes the shaft 8 and the attached regulating plate 4 and stopper 9 to correspondingly rotate around the rotor axis. The cam plates 5 and 6 and the cam grooves 11a, 52 and 11b, 54 remain stationary as the plate 4 and stopper 9 rotate. With reference to FIGS. 5 and 6, as the plate 4 rotates, in the direction of the arrow in FIGS. 5 and 6 to the left, or clockwise with respect to FIG. 4, the free, trailing end 34 of the stopper is swung axially with respect to the supported leading end 32 of the stopper, through the opening 10 and gradually into the groove 11b in the cam plate 6, due to the groove bottom wall cam surface 52 pushing upon the stopper 9. As shown in FIG. 6, eventually, the stopper 9 is rotated past the inclined, non-continuous part 17 of the surface 54, and the shaped side wall 56 of the stopper 9 causes the stopper 9 to slide up and ride over the non-continuous cam surface part 17. This shifts the stopper 9 axially through the opening 10 and back into the groove 11a. As a result of the shaping of the stopper 9 and the non-continuous part 17, there is no hindrance to the rotation of the plate 4 and the stopper 9 in the correct direction, while the stopper 9 simply shifts axially back and forth within the grooves 11.

With reference to FIG. 7, if the rotor 13, 8 starts rotating in the incorrect, reverse direction, that is counterclockwise in FIG. 4 or to the right in FIG. 7, the stopper 9 is moved by the cam surface 54 toward the cam surface 52. As the stopper 9 begins passing over the non-continuous part 17 of the surface 54, the surface 52 does not urge the stopper 9 toward the surface 54. Instead, the stopper 9 remains in the groove 11a, and slightly further rotation of the regulating plate 4 to the right in FIG. 7 brings the end portion 34 of the stopper 9 into abutment with the sharply inclined stopper wall 12 defined in the cam surface 52 of the cam plate 5. Rotation of the stopper 9, of the regulating plate 4, of the rotor shaft 8 and of the rotor 13 is abruptly halted. The impact bounces the stopper 9 and regulating plate 4 in the reverse direction which is the correct direction of rotation of the rotor. This thereby starts and thereafter maintains the correct direction of rotation of the stopper 9, regulating plate 4 and rotor 13.

One preferred direction of rotor rotation is obtained with the cam plates 5 and 6 arranged as illustrated. To effect preferred rotation in the opposite direction with minimal variation in the illustrated structure, it is merely necessary to reverse the cam plates 5 and 6 so that the cam plate 6 is outboard of the rotor while the cam plate 5 is inboard.

The cam plate 5 and 6 are shown as separate from the respective bracket covers 3, 7. To reduce the number of parts, the cam plate 5 may be formed in one part with the cover 3 and/or the cam plate 6 may be formed in one part with the holding plate 7.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A rotary direction regulating device for a rotor of a synchronous electric motor or the like, the regulating device comprising:
    a stopper supported eccentrically of the rotor and supported thereto for rotating therewith, whereby the stopper rotates over an annular pathway; the stopper being supported for also being shiftable axially with respect to the rotor while the stopper is being rotated around the axis of the rotor;
    cam means located axially next to the stopper and the cam means being supported to prevent rotation of the cam means as the rotor and stopper rotate, the cam means being shaped for engaging the stopper over the annular pathway thereof and being shaped for shifting the stopper axially of the rotor; the cam means being shaped to include a stopper wall inclined with respect to the rotary path of the stopper such that with the stopper moved axially in one axial direction, the stopper engages the stopper wall upon rotation of the rotor and the stopper in one rotary direction; the cam means being further shaped that upon rotation of the rotor and the stopper in the opposite rotary direction, the stopper slides past the stopper wall without abutting the stopper wall and the rotor is thereby permitted by the stopper and the stopper wall to continue rotating in the opposite rotary direction.

2. The rotary direction regulating device of claim 1, wherein the cam means comprises first and second opposite, spaced apart cams on opposite axial sides of the stopper; the stopper is guided between the cams, and the cams are shaped for causing axial movement of the stopper; the stopper wall being defined in the first cam; in the circumferential vicinity of the stopper wall, the second cam being shaped for shifting the stopper axially toward the first cam far enough that the stopper abuts the stopper wall upon rotation of the rotor and the stopper in the one rotary direction.

3. The rotary direction regulating device of claim 2, wherein in the circumferential vicinity of the stopper wall, the second cam is more gradually inclined, in a direction to move the stopper toward the first cam, than the incline of the stopper wall, and the incline of the second cam is for gradually moving the stopper forward the first cam, without the stopper and thereby the rotor being halted from rotation in the opposite rotary direction by the second cam.

4. The rotary direction regulating device of claim 3, wherein the first cam has a general direction of incline toward the second cam, including a first end of the first cam that is axially further from the stopper surface and a second end of the first cam that is nearer the stopper and the stopper wall is defined between the first and the second ends of the first cam; the first cam being gradually inclined with respect to the axis of the rotor between the first and second ends thereof, while the stopper wall is sharply inclined with respect to the first cam.

5. The rotary direction regulating device of claim 4, wherein in the circumferential vicinity of the stopper wall, the second cam surface is inclined in the direction such that the second cam in the vicinity of the stopper wall is generally opposed to the stopper wall.

6. The rotary direction regulating device of claim 5, wherein away from th circumferential vicinity of the stopper wall, the second cam is generally inclined parallel to the first cam.

7. The rotary direction regulating device of claim 6, further comprising a regulating plate for supporting the stopper to the rotor; the regulating plate being connected to the rotor for rotating therewith and for thereby rotating the stopper with the rotor; the stopper being supported to the regulating plate for shifting axially with respect to the regulating plate and the rotor.

8. The rotary direction regulating device of claim 7, further comprising a hole defined by side walls extending axially through the regulating plate and the stopper being supported in the hole in the regulating plate and being guided for movement by the side walls defining the hole in the regulating plate.

9. The rotary direction regulating device of claim 8, wherein the side walls defining the hole in the regulating plate include a circumferentially leading side wall, which is at the side of the hole which leads the rotation of the hole in the one rotary direction of the rotor, and include a trailing side wall which trails that rotation of the rotor; the stopper being swingably supported to the leading side wall and being freely swingable with respect to the trailing side wall, whereby the stopper shifts axially by swinging around its attachment at the leading side wall.

10. The rotary direction regulating device of claim 9, wherein the stopper is in the shape of an arcuate segment shaped element.

11. The rotary direction regulating device of claim 2, further comprising a regulating plate for supporting the stopper to the rotor; the regulating plate being connected to the rotor for rotating therewith and for thereby rotating the stopper with the rotor; the stopper being supported to the regulating plate for shifting axially with respect to the regulating plate and the rotor.

12. The rotary direction regulating device of claim 2, wherein the first and second cams are defined by respective first and second surfaces opposed to opposite axial sides of the stopper.

13. The rotary direction regulating device of claim 12, further comprising cam plates disposed at opposite axial sides of the stopper and grooves in the cam plates in which the cam surfaces are defined.

14. The rotary direction regulating device of claim 13, wherein the cam surfaces are defined at the bottoms of the cam grooves in the cam plates.

15. The rotary direction regulating device of claim 13, further comprising a covering for surrounding the cam plates and the stopper and for holding them in position.

16. The rotary direction regulating device of claim 15, wherein the cam plates are attached to the covering.

17. The rotary direction regulating device of claim 8, wherein the first and second cams are defined by respective first and second surfaces opposed to opposite axial sides of the stopper; cam plates disposed at opposite axial sides of the stopper and grooves in the cam plates in which the cam surfaces are defined;

the cam plates seat against the regulating plate, which orients the cam surfaces and spaces the cam surfaces approximately the axial length of the stopper.

* * * * *